C. T. SMALL.
MACHINE FOR FORMING RECEPTACLES.
APPLICATION FILED NOV. 8, 1911.

1,209,217.

Patented Dec. 19, 1916.
14 SHEETS—SHEET 1.

WITNESSES:
L. L. Mead.
W. A. Alexander

INVENTOR
C. T. Small
ATTORNEY

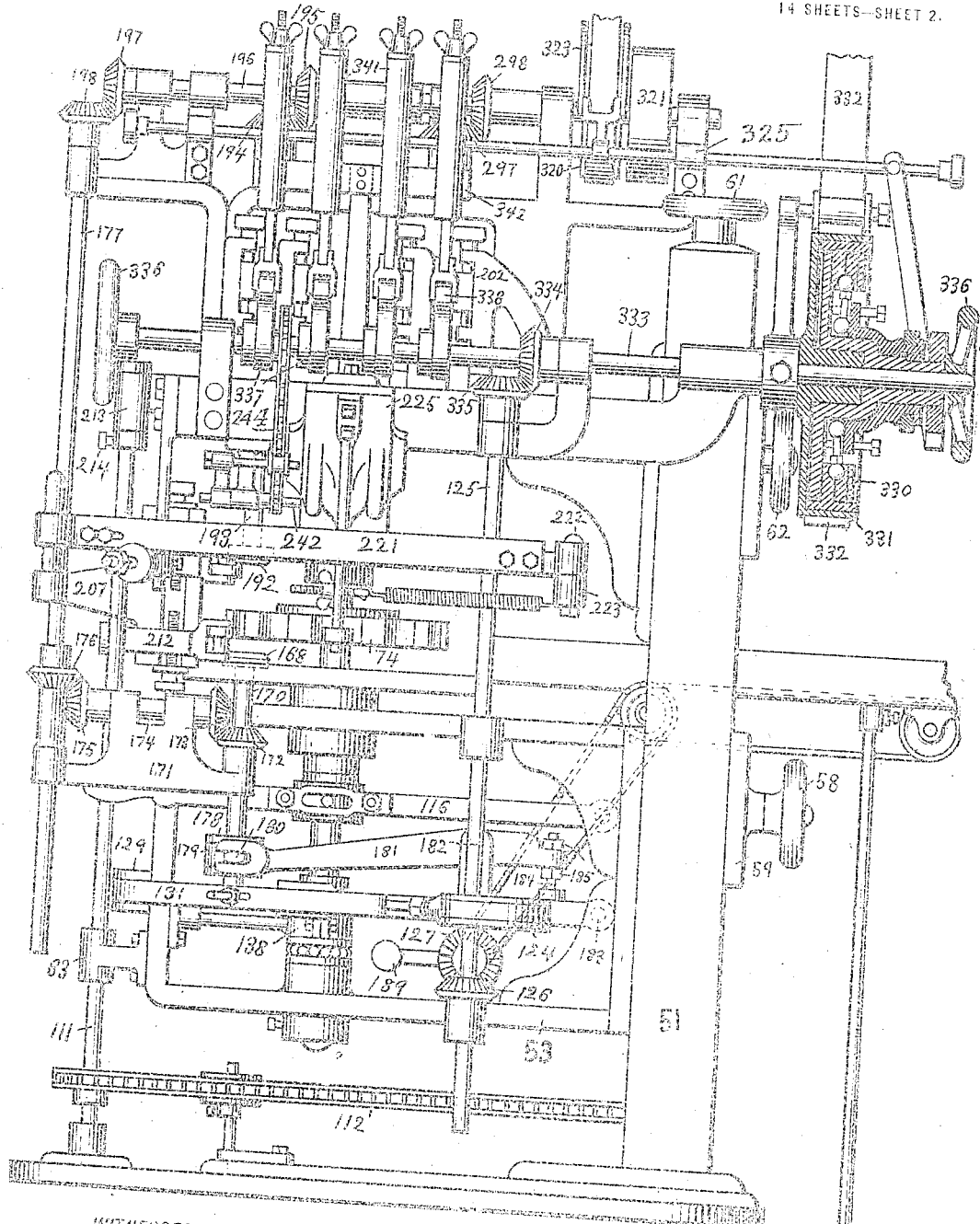

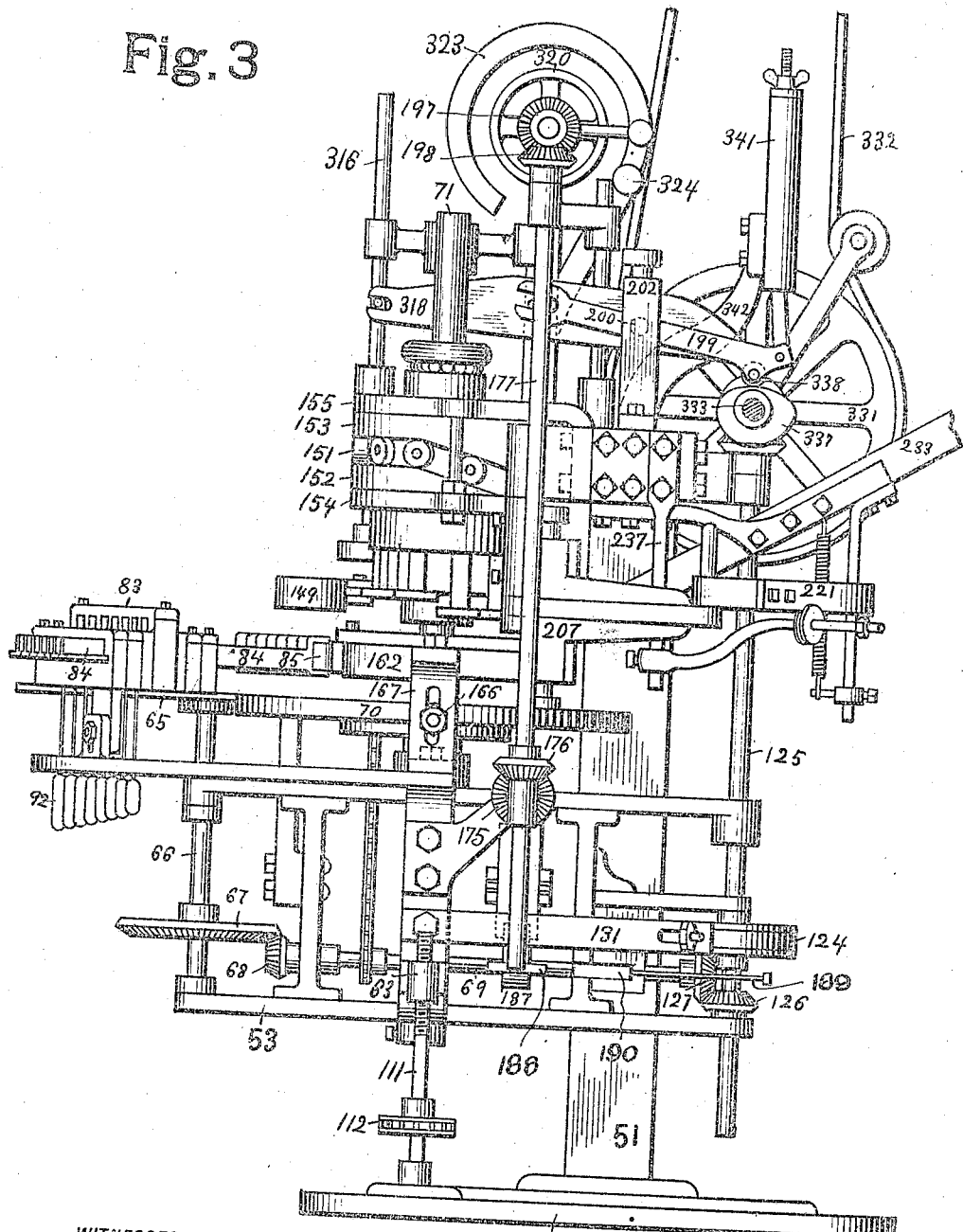

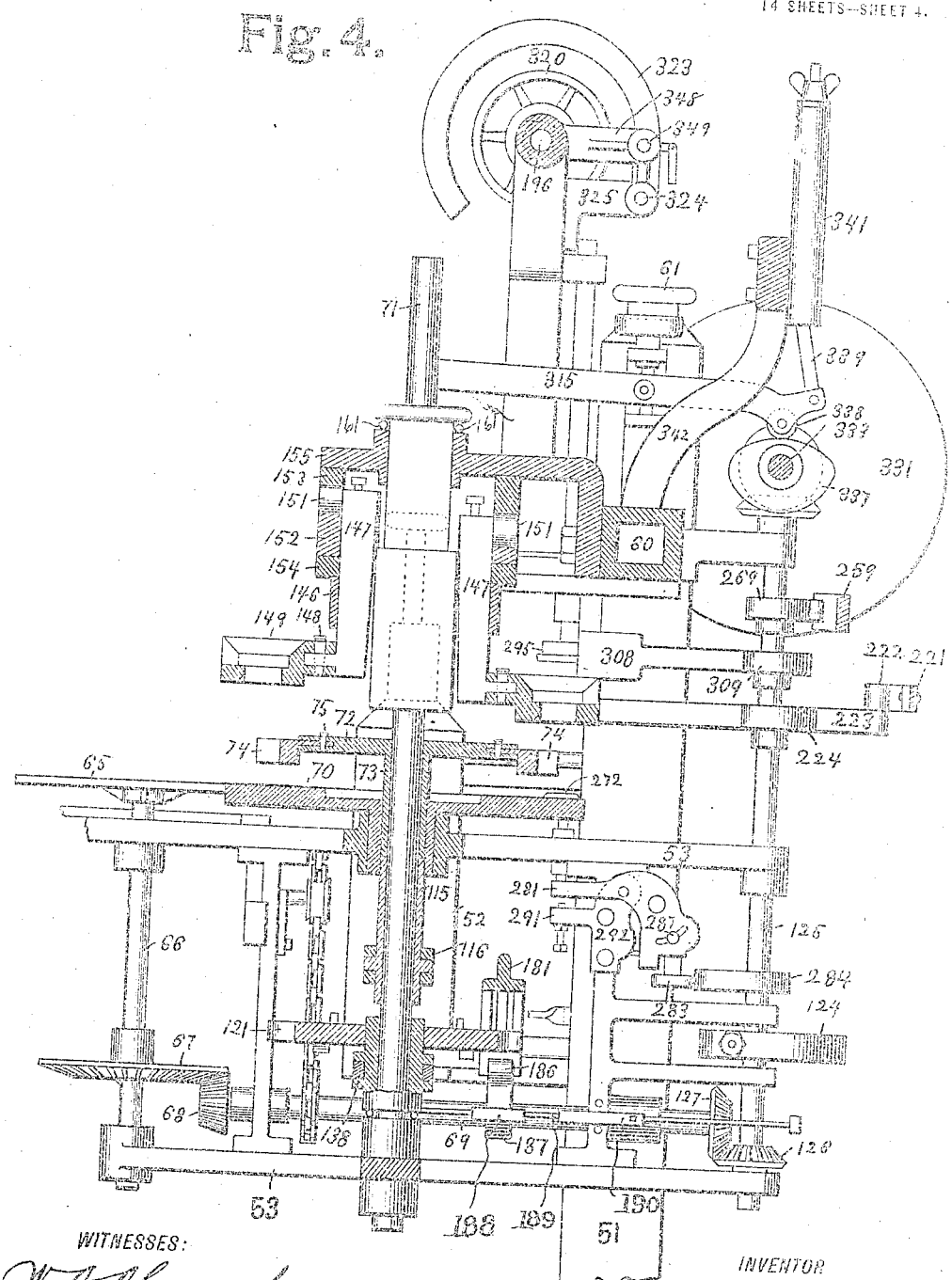

C. T. SMALL.
MACHINE FOR FORMING RECEPTACLES.
APPLICATION FILED NOV. 6, 1911.

1,209,217.

Patented Dec. 19, 1916.
14 SHEETS—SHEET 5.

WITNESSES:
L. L. Mead.
W. A. Alexander.

INVENTOR
C. T. Small.
E. E. Huffman
ATTORNEY

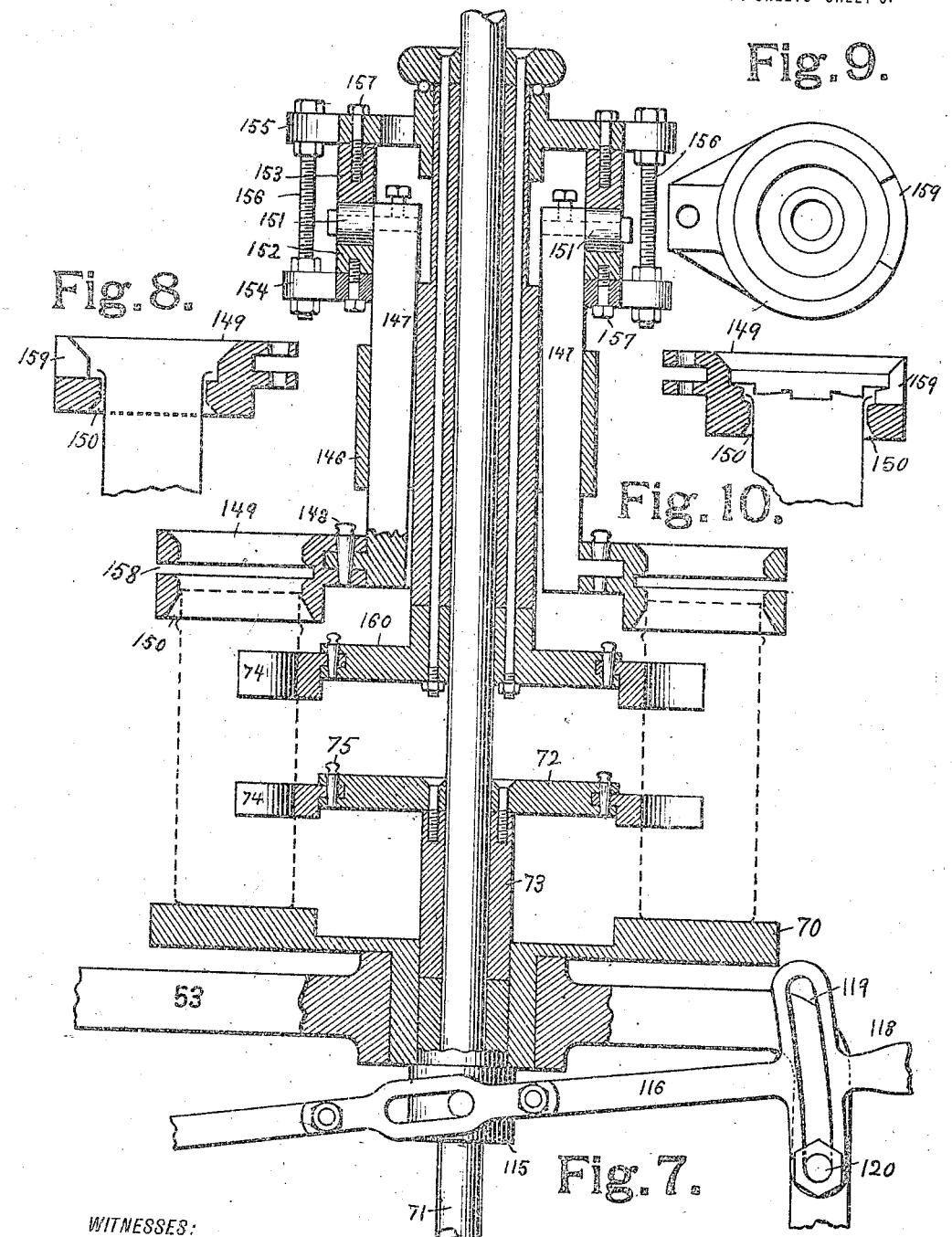

C. T. SMALL.
MACHINE FOR FORMING RECEPTACLES.
APPLICATION FILED NOV. 8, 1911.
1,209,217.
Patented Dec. 19, 1916.
14 SHEETS—SHEET 7.
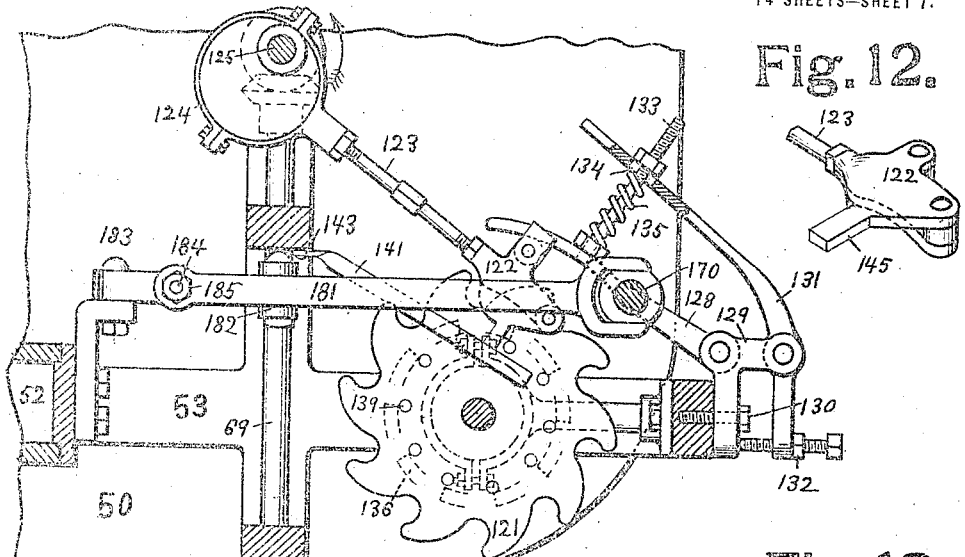
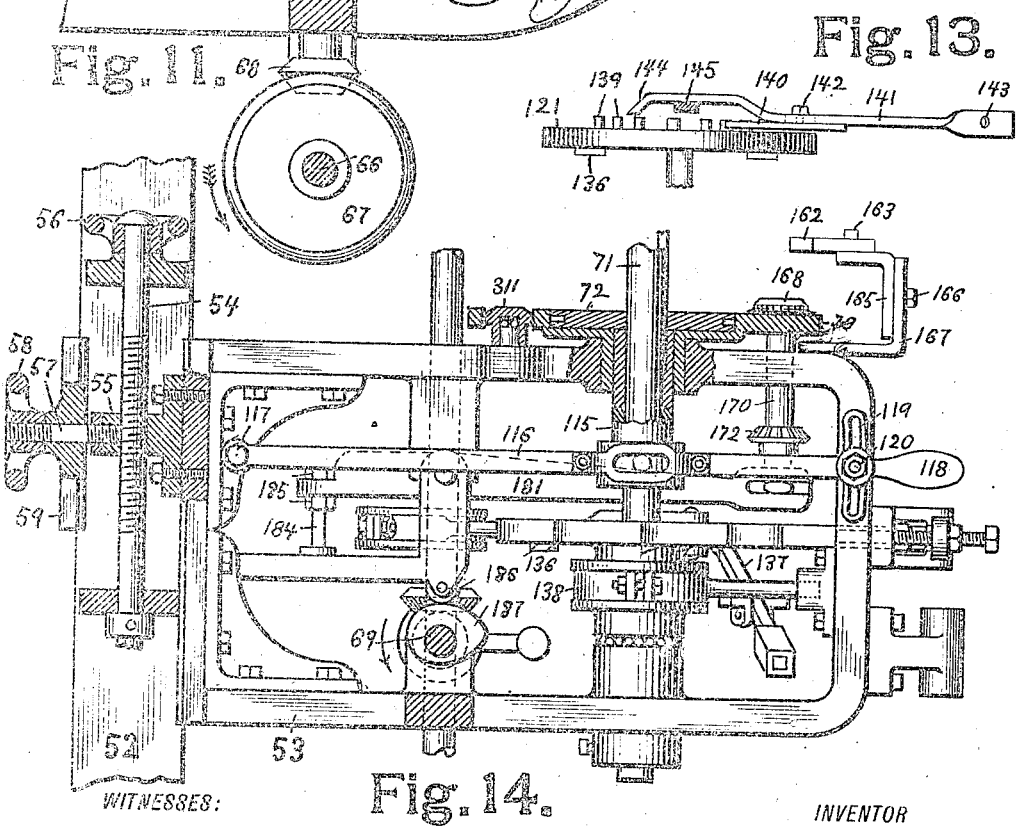
WITNESSES:
L. L. Mead
W. H. Alexander
INVENTOR
C. T. Small
BY E. E. Huffman
ATTORNEY

C. T. SMALL.
MACHINE FOR FORMING RECEPTACLES.
APPLICATION FILED NOV. 8, 1911.

1,209,217.

Patented Dec. 19, 1916.
14 SHEETS—SHEET 8.

WITNESSES:
L. L. Mead.
W. H. Alexander

INVENTOR
C. T. Small
E. E. Huffman
ATTORNEY

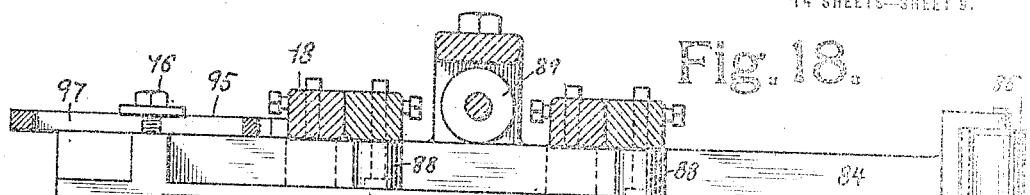
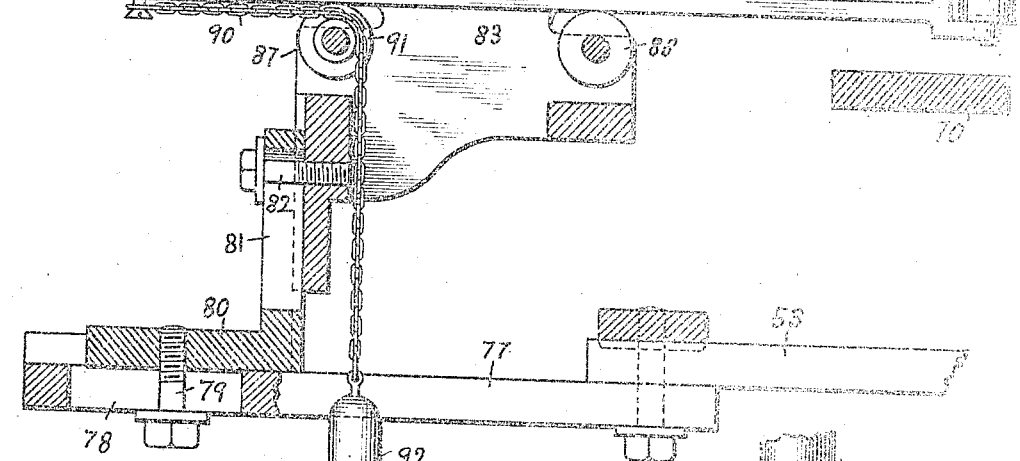
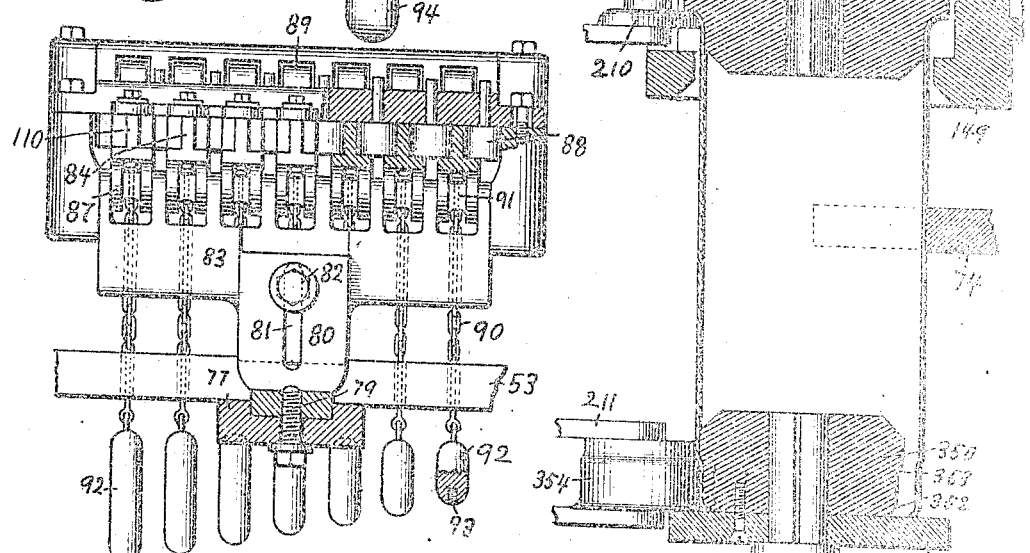

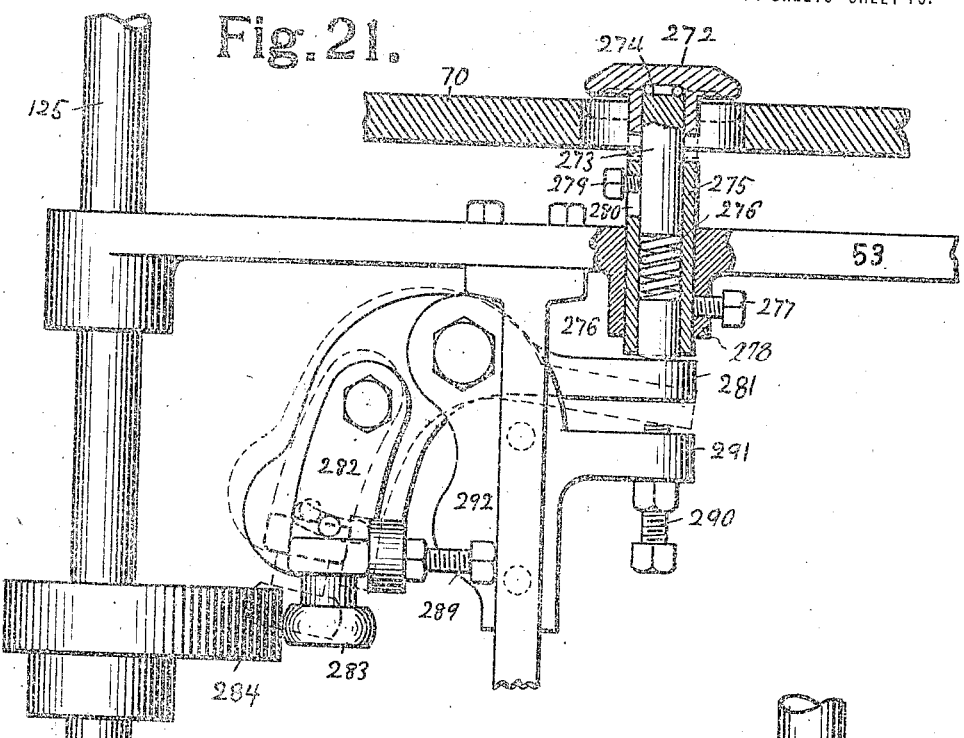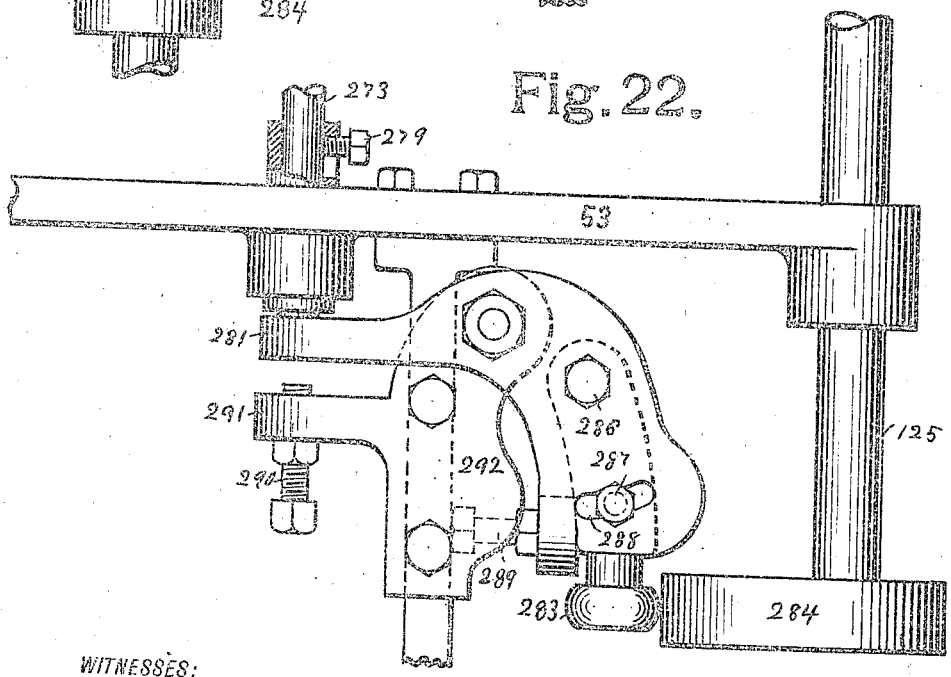

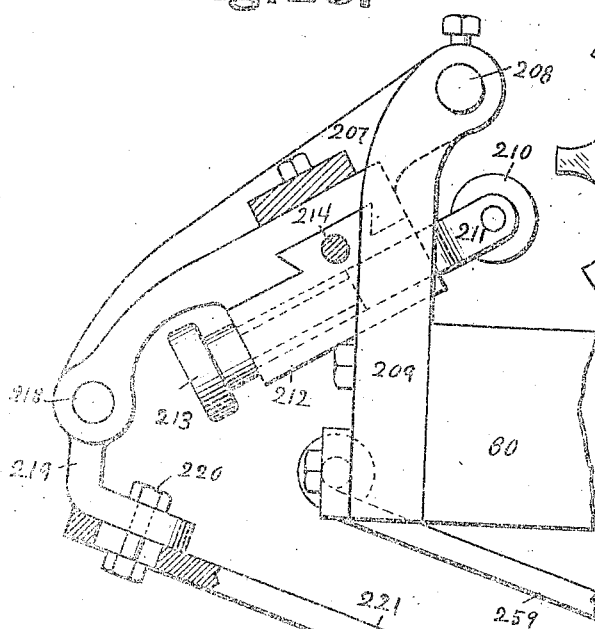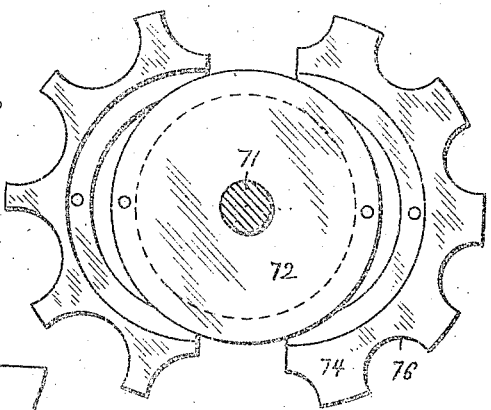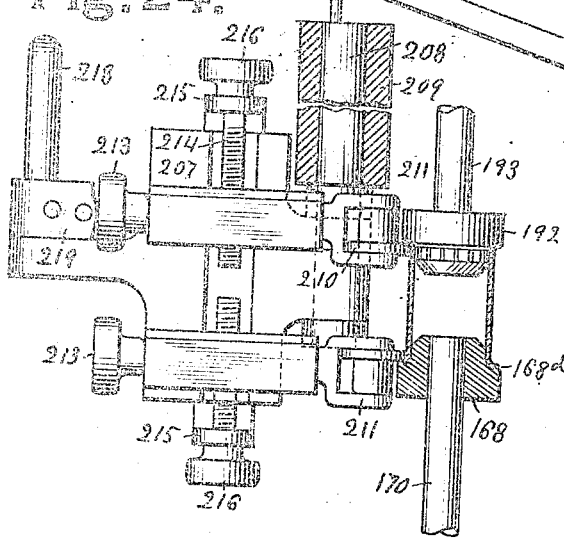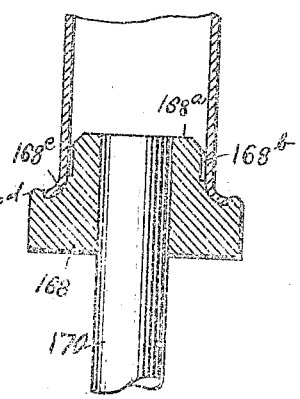

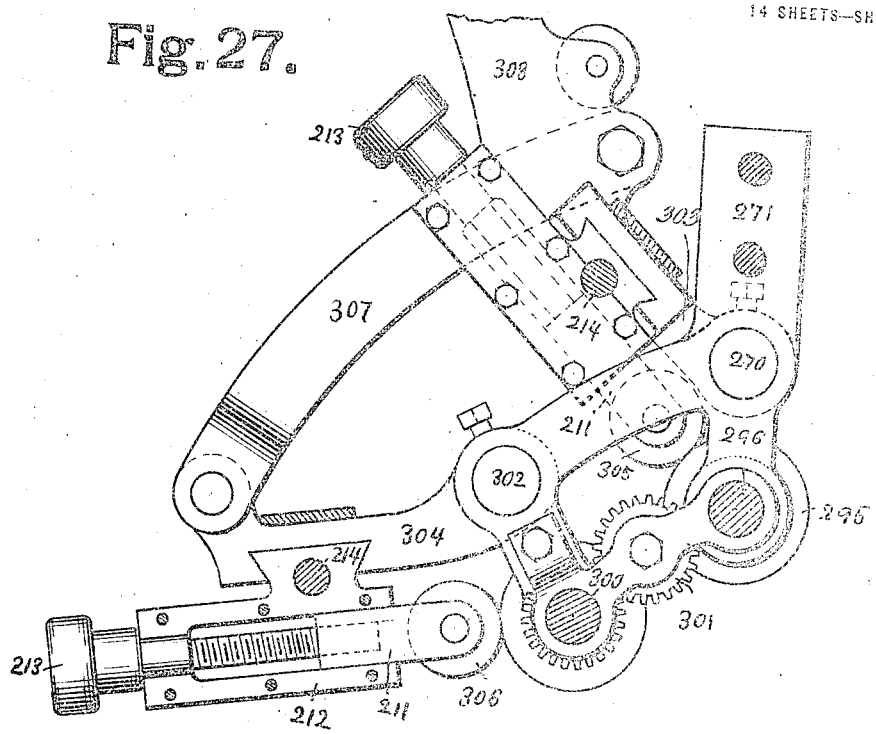
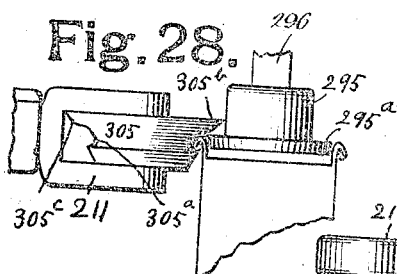
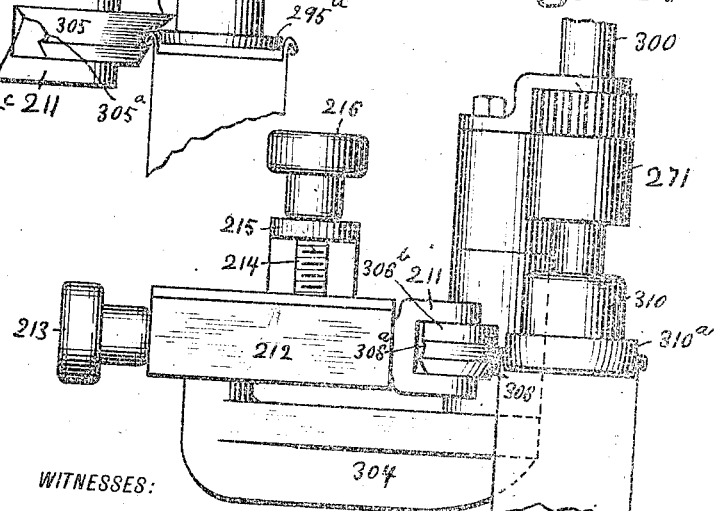

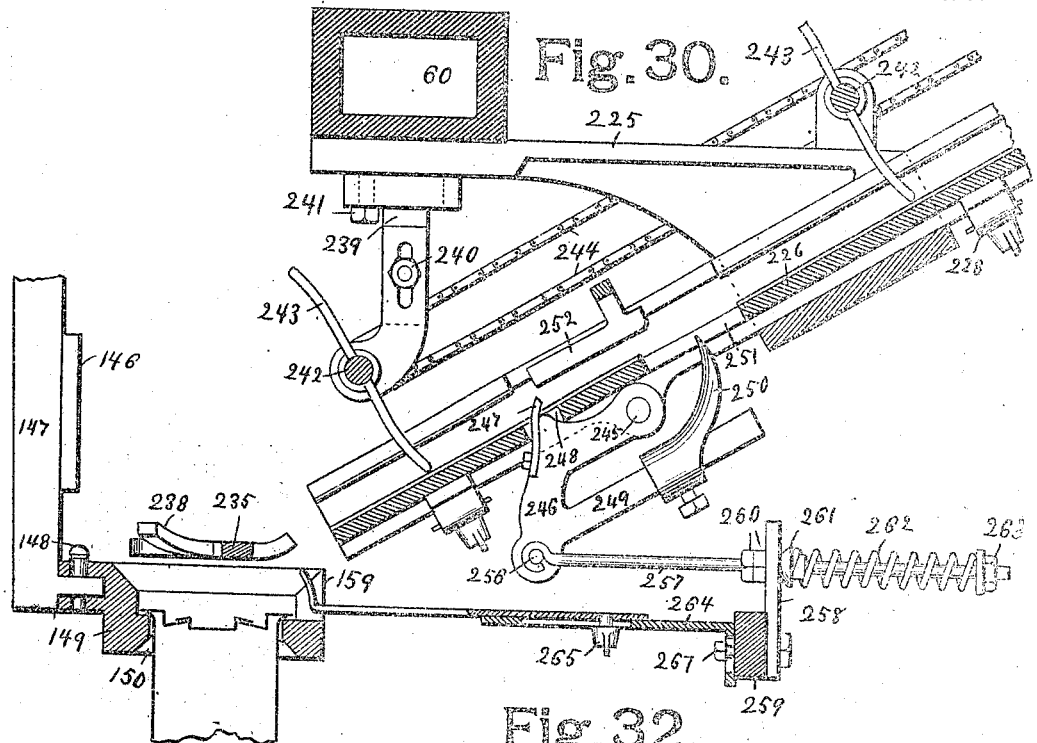
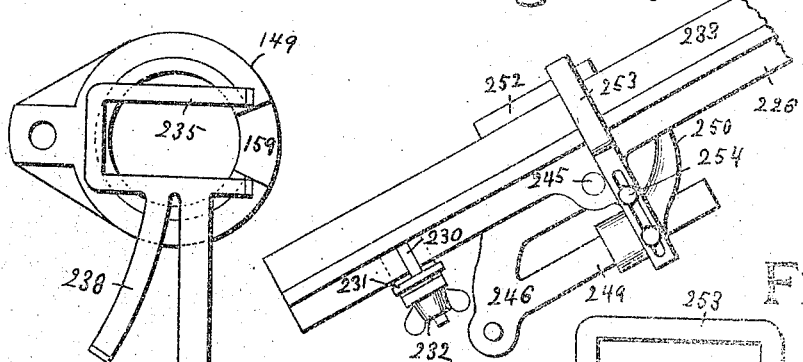
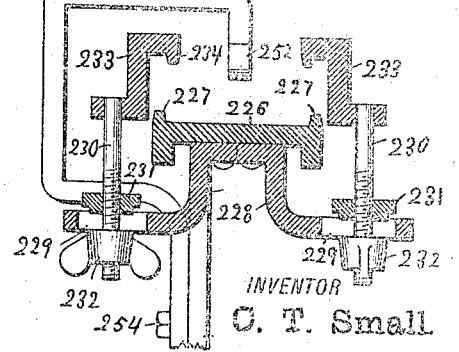

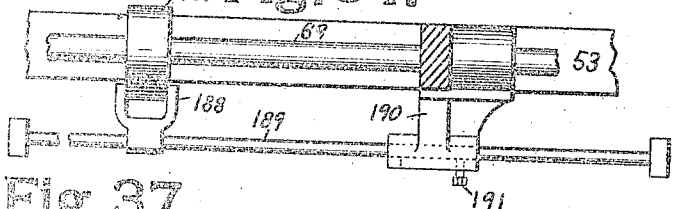
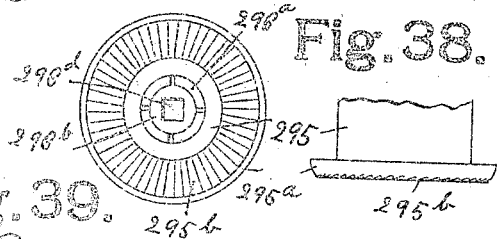
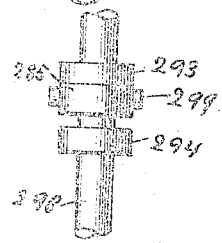
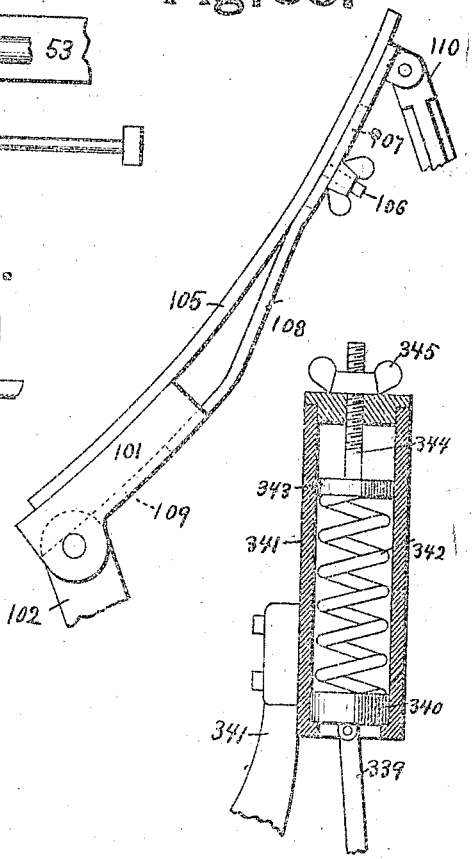

UNITED STATES PATENT OFFICE.

CHESLEY T. SMALL, OF ST. LOUIS, MISSOURI, ASSIGNOR, BY MESNE ASSIGNMENTS, TO AUTOMATIC CAN FILLING MACHINERY COMPANY, OF NEWARK, NEW JERSEY, A CORPORATION OF NEW JERSEY.

MACHINE FOR FORMING RECEPTACLES.

1,209,217.

Specification of Letters Patent. Patented Dec. 19, 1916.

Application filed November 8, 1911. Serial No. 659,224.

*To all whom it may concern:*

Be it known that I, CHESLEY T. SMALL, a citizen of the United States, residing at St. Louis, Missouri, have invented a certain new and useful Machine for Forming Receptacles, of which the following is such a full, clear, and exact description as will enable any one skilled in the art to which it appertains to make and use the same, reference being had to the accompanying drawings, forming part of this specification.

My invention relates to a machine for performing various operations upon cans or other packages or receptacles, and its object is to provide a machine which will perform the various operations rapidly and accurately and which, owing to the adjustability of its parts and interchangeability of its tools and holders, will be adaptable to a wide range of work on various forms and sizes of receptacles.

In the present invention I have illustrated a form of my machine provided with accessories for forming upon ordinary cylindrical can bodies flanges either internal or external, and for securing to said can bodies end pieces or caps by means of a double seam. As above stated, my machine is applicable to a wide range of work, and I do not wish to be understood as limiting myself to the particular constructions and functions described except as specifically stated in the claims.

Figure 1:
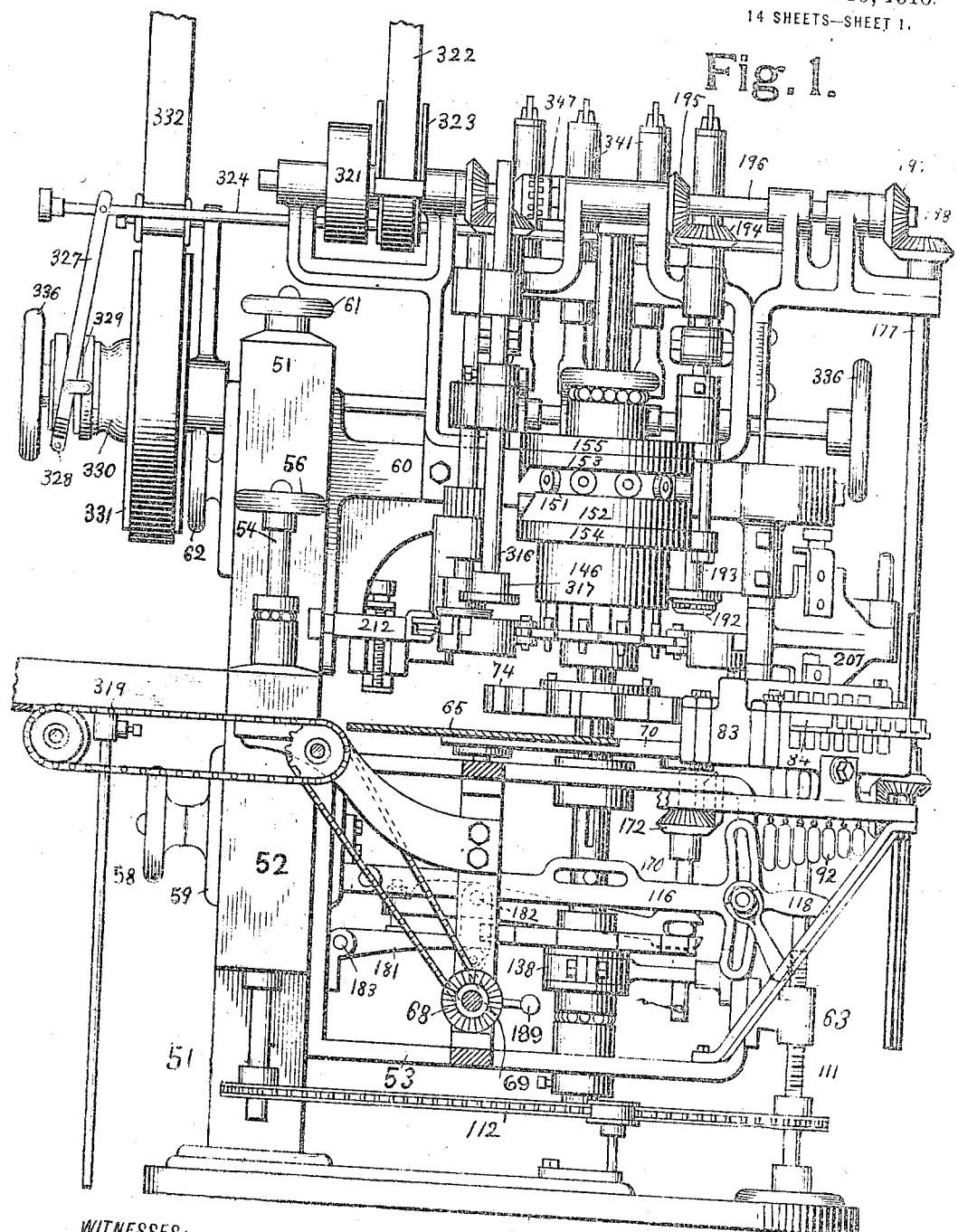
Figures 5, 6:
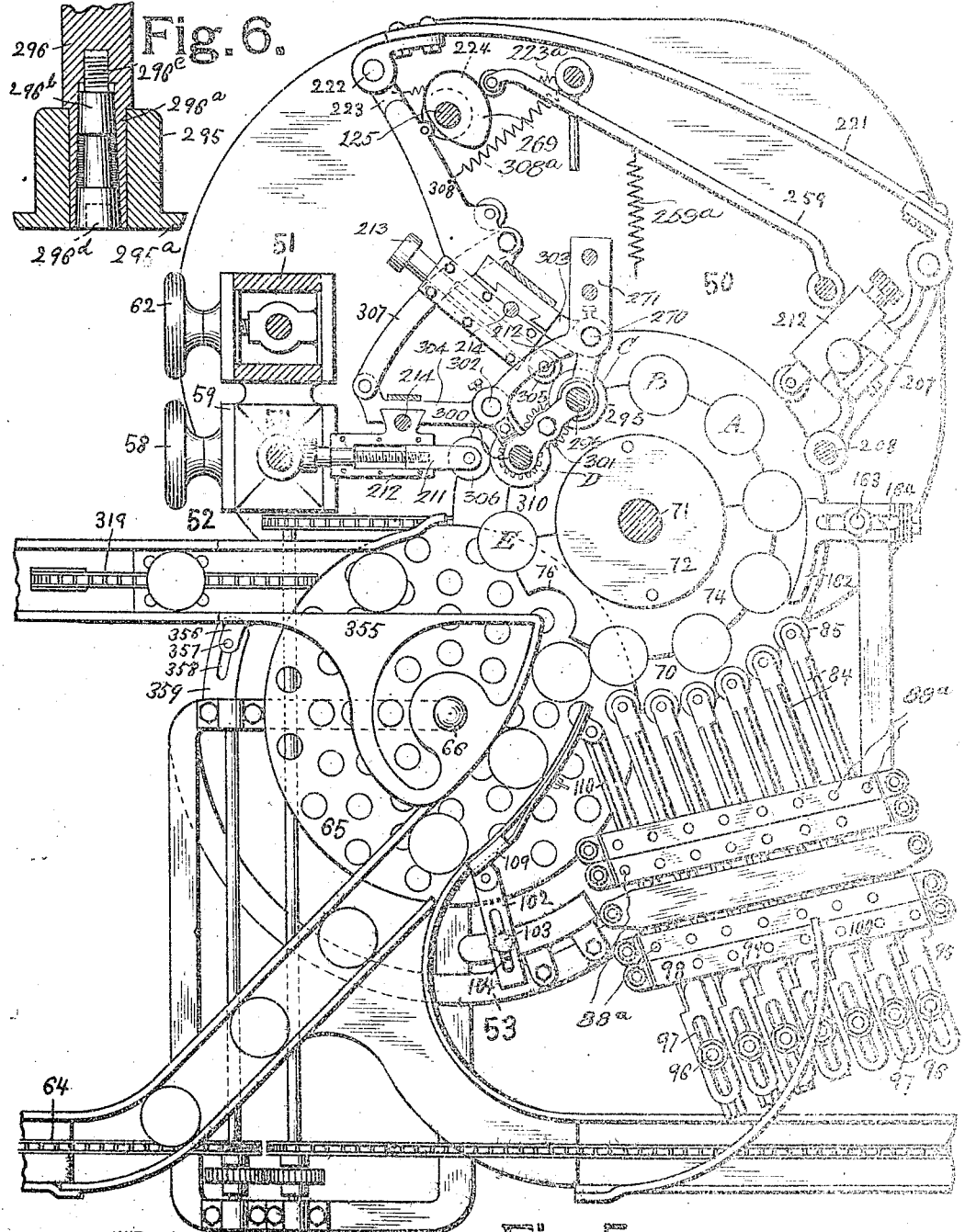
Figure 15:
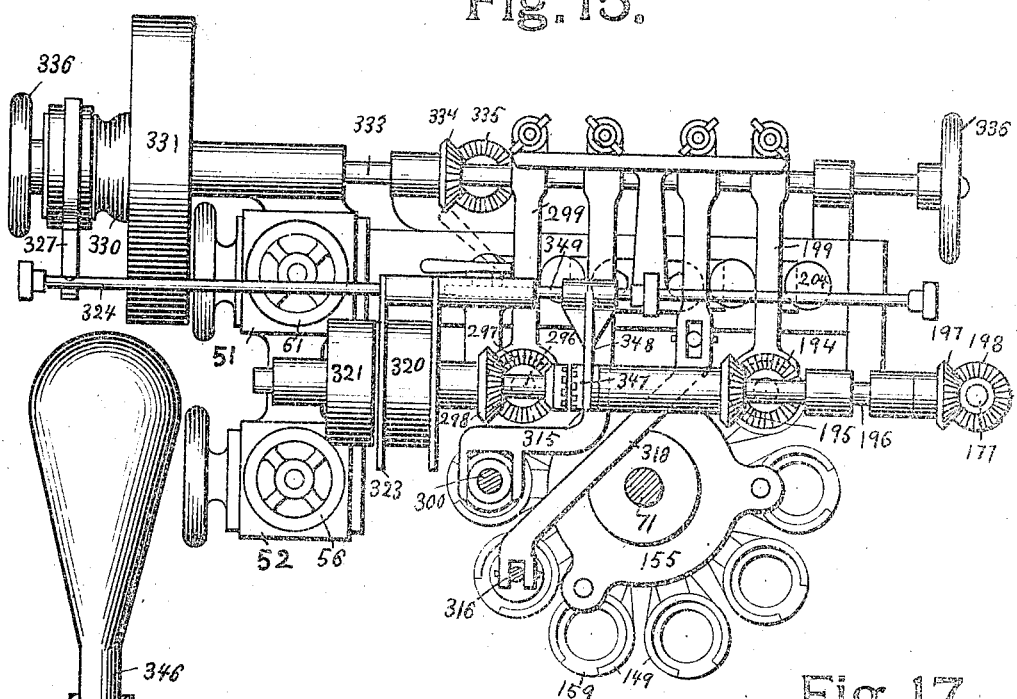
Figure 16:
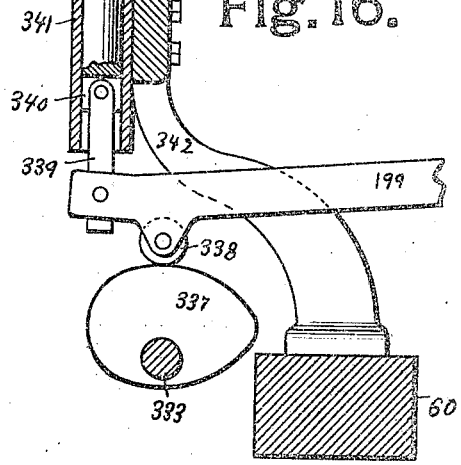
Figure 17:
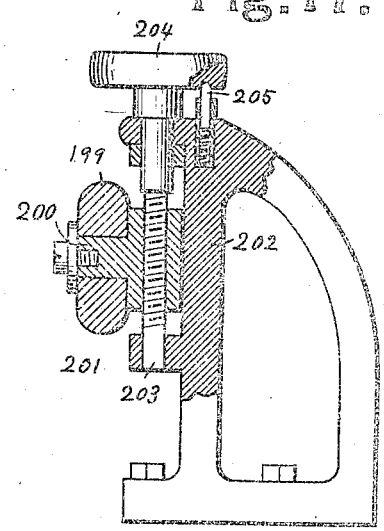

In the accompanying drawings, Figure 1 is a front elevation; Fig. 2 is a rear elevation, all of the cams carried on shaft 125 being omitted, except eccentric 124 for rotating the table; Fig. 3 is a side view, the same parts being omitted as in Fig. 2, the feed chain for driving the flexible fingers also being omitted; Fig. 4 a vertical central section through the main portion of the machine; Fig. 5 a horizontal section, the standards 51 and 52 being shown somewhat closer together than in Fig. 4 of the drawings, for the purpose of convenience; Fig. 6 a sectional view of one of the chucks; Fig. 7 an enlarged sectional view through the main shaft of the machine; Figs. 8, 9 and 10 detail views of the can holders; Fig. 11 an enlarged view of the operating mechanism for the main shaft; Fig. 12 a detail of the feeding pawl; Fig. 13 a side elevation of some of the parts shown in Fig. 11; Fig. 14 a view partly in section and partly in elevation of the parts shown in Fig. 11; Fig. 15 a top plan view of some of the parts, the main spindle being shown in section; Fig. 16 a detail view of the counterbalancing mechanism for the operating spindles; Fig. 17 a detail view of the adjusting mechanism for the levers of the operating spindles; Figs. 18 and 19 enlarged detail views of the ram mechanism for seating the cans; Fig. 20 an enlarged sectional view showing the chucks for forming the flanges upon the can body; Figs. 21 and 22 enlarged detail views of the mechanism for applying pressure to force the metal of the can body into the seam; Figs. 23 and 24 detail views of the mechanism carrying the forming rolls for forming the flanges upon the can; Fig. 25 a view showing the manner of changing the can advancing mechanism; Fig. 26 an enlarged sectional view of one of the chucks; Figs. 27, 28 and 29 enlarged detail views of the seaming rolls and operating mechanisms therefor; Fig. 30 a sectional view of the cap feeding mechanism; Figs. 31, 32 and 33 detail views of some of the parts shown in Fig. 30; Fig. 34 an enlarged view of the shifting mechanism for throwing one of the lower operating spindles out of operation; Fig. 35 a detail view of the guide plate for delivering the cans to the advancing mechanism; Fig. 36 a view showing a modification of the spindle counterbalancing mechanism; Figs. 37 and 38 detail views of one of the chucks, and Fig. 39 a detail view showing the manner of securing play in the seaming chuck.

50 represents the bed plate of the machine. Secured to this plate 50 is an upright or standard 51 having secured to one side thereof a similar but shorter standard 52, as best shown in Figs. 4 and 5. Carried by the standard 52 is the lower part 53 of the main frame. This frame 53 is secured to a standard by means of a threaded rod 54 passing through a lug 55 and provided with a hand wheel 56 as best shown in Fig. 14. It will be evident that by rotating the hand wheel 56 the lower main frame 53 of the machine may be raised and lowered for the purposes to be hereinafter described. In order to firmly lock the frame 53 in any desired position the lug 55 has threaded into it a rod 57 provided with a hand wheel 58 so as to clamp a friction plate 59 against the upright 52. The upper main frame 60 of the machine is attached to the upright 51 by means of mechanism similar to that just described.

61 represents the hand wheel for raising and lowering the frame 60, and 62 the hand wheel for clamping said frame in its adjusted position.

In order to support the outer end of the frame 53 I provide said frame with a bracket 63 in which is threaded a rod 111 supported from the base 50. This rod 111 is driven simultaneously with the rod 54 by a sprocket chain 112 surrounding sprocket wheels in the two shafts, as best shown in Figs. 1 and 2. The rod 111 may also be extended upwardly and adjustably secured to the upper frame 60 by means of a bracket 113, and set screw 114 so as to form a tie-bar between the two frames, thus increasing the rigidity of the machine.

64 represents a conveyer for delivering the can bodies to the machine. This conveyer 64 deposits the can bodies upon a rotary table 65 carried upon a vertical shaft 66 journaled in the frame 53. This shaft 66 is provided with a bevel gear wheel 67 meshing with a second bevel gear wheel 68 carried upon a horizontal shaft 69 also journaled in the frame 53. This shaft 69 is driven by gearing which will hereinafter be described. The rotary table 65 delivers the cans to a stationary table 70 which surrounds the main spindle 71 of the machine. Directly above this stationary table 70 is a disk 72 carried upon a sleeve 73 surrounding the spindle 71. This disk 72 carries a removable extension 74 shown in detail in Fig. 25. This extension 74 is formed in two parts and is held in position by means of tapered pins 75. Formed in the periphery of the extension 74 are a number of semi-cylindrical recesses 76 adapted to receive the cans fed onto the stationary table 70 by the rotary table 65. In order to insure the seating of the cans in the recesses 76 I provide a ram mechanism shown in Fig. 5 and in detail in Figs. 18 and 19. Secured to the frame 53 is an extension 77 provided with slots 78 through which passes a screw 79 for adjustably holding an angle plate 80. This angle plate is provided with a slot 81 through which passes a screw 82 for adjustably holding the frame 83 of the ram mechanism. Mounted in this frame 83 are a number of reciprocating rams 84 each provided on its end with an anti-friction roller 85 adapted to make contact with the cans as they pass from the rotary to the non-rotary table and to insure their seating in the recesses 76. The rams 84 are mounted upon horizontal rollers 86 and 87, and have placed between them vertical rolls 88 so as to reduce the friction to a minimum. The rolls 88 are mounted on trunnions 88ª, which are staggered as shown in Fig. 5, so that each roll bears only on one ram. The rams are also held down against the rolls 86 and 87 by rolls 89 and are thus free to move with the smallest possible amount of friction. In order to force the rams inwardly so as to seat the cans each of the said rams has secured to it a chain 90 placed in a groove 91 in the roll 87 and having secured to its end a weight 92. This weight 92 is provided at its lower extremity with a threaded opening 93 so that if desired a separate weight 94 may be secured to it in order to vary the tension on the ram 84.

It will be evident that, by this construction, the rams as a whole may be adjusted vertically and also toward and away from the member 74 in which are formed the recesses 76. It is desirable also to individually adjust the rams 84 to secure their most successful operation upon cans of varying diameter. In order to obtain this result I secure to the upper and rear part of each of the said rams 84 a stop plate 95 by means of a bolt 96 passing through a slot 97 in the said plate. Each of these stop plates 95 is adapted to bear against a cross-bar 98 and thus limit the movement of the individual rams toward the member 74. Each of these stop plates 95 is provided with a lateral projection 99 adapted to strike against a shoulder 100 upon the next stop plate to the right, so that after any ram has been moved through a predetermined distance it will actuate the necessary ram to the right thereof. In order to guide the cans from the rotary table 65 to the point where they are engaged by the rams 84, I provide a guide plate mechanism shown in Fig. 5, and in detail in Fig. 35. This guide plate mechanism consists of a block 101 pivoted to an arm 102 adjustably secured to the frame 53 by means of a bolt 103 passing through a slot 104. Sliding on the face of the block 101 is the plate 105 which guides the cans, as it is necessary for this plate to have a sliding movement as well as a pivotal movement. Secured to the rear of the plate 105 by means of a thumb-screw 106 passing through a slot 107, is a plate 108. This plate 108 slides in a groove 109 in the rear face of the block 101. The plate 108 is pivoted to a ram 110 which is similar to the rams 84 hereinbefore described except that it is of course not provided with the anti-friction roll 85 and that its stop plate 95 is not provided with the lateral projection 99 for engaging the next ram to the right.

It will be evident from this construction that the plate 105 is free to move so as to allow the cans to seat properly in the recesses 76, and at the same time it can be adjusted to suit the requirements of cans of varying diameters. The disk 72 hereinbefore described is keyed to a shaft 71 so as to rotate therewith but to be capable of movement in the direction of the length of the shaft. The sleeve 73 carrying this disk bears upon a sleeve 115 which is loosely mounted upon the shaft 71. The sleeve 115 is engaged by a lever 116 pivoted at 117 to the frame 53 and at its opposite end provided with a handle 118 and a curved slot 119. A bolt 120 passes through the slot 119 so as to secure the lever in any suitable position and thus raise or lower the disk 72 to accommodate the member 74 to cans of varying height. The shaft 71 is provided directly below the end of the sleeve 115 with a ratchet wheel 121 by means of which the said shaft is rotated. This ratchet wheel 121 is engaged by a pawl 122 shown in detail in Figs. 11 and 12. A pawl 122 is carried on the end of a rod 123 connected to an eccentric 124 mounted upon a vertical shaft 125 connected by double gear wheels 126 and 127 rotatively with the shaft 69 hereinbefore referred to. It will be evident that as the shaft 125 rotates, the ratchet wheel 121, and consequently the member 74 for advancing the cans, will be fed forward step by step. The ratchet wheel 121 will of course be provided with a number of teeth equal to the number of recesses 76 in the periphery of the member 74. In order that the pawl 122 may be thrown out of engagement with the ratchet wheel when it is desired to move said wheel backward, this pawl is held in engagement with the ratchet wheel by means of a lever 128 which is pivoted to a bracket 129. This bracket 129 is in turn pivoted to the frame 53 by means of a pivot bolt 130. The bracket 129 also carries a second lever 131, the position of which is adjusted by means of a set screw 132. The lever 129 is provided with a rod 133 passing through an opening 134 in the lever 131, and is surrounded by a coil spring 135.

It will be evident that by compressing the coil spring 135 the lever 128 can be moved out of engagement with the rear of the pawl 122. Both levers together with bracket 129 can then be swung upwardly on the pivot bolt 130 so as to leave the pawl 122 free to be moved entirely out of engagement with the wheel 121. In order to prevent the accidental rearward movement of the wheel 121 its lower face is provided with a series of teeth 136 which are engaged by the end of a weighted detent 137. In order to give a smooth and easy movement without jars to the parts operated by the wheel 121, I provide the hub of said wheel with a groove in which is arranged a friction brake 138, best shown in Figs. 4 and 14. This brake also tends to prevent the over-rotation of the wheel 121. As such over-rotation of the wheel, however, is likely to cause breakage of the machine, I prefer to use, in addition to the brake 138, a positive stop mechanism. I therefore supply the upper face of the wheel 121 with a series of pins 139 corresponding with the number of teeth contained in said wheel. These pins 139 are adapted to be engaged by a stop 140 adjustably secured to a lever 141 by means of a bolt 142. This lever 141 is pivoted to the frame 53 at 143 and is provided at its outer end with an inclined portion 144 adapted to be engaged by a projection 145 on the pawl 122. When the pawl is in its forward position therefore, ready to move the wheel 121, the lever 141 will be lifted so as to move the stop 140 out of the path of the pins. After a short travel, however, the lever 141 will drop back so as to bring the stop into the path of the next succeeding pin and consequently there will be a positive stop for preventing the over-rotation of the wheel 121. Carried on the shaft 71 above the disk 72 is a head or turret 146 adapted to rotate with said shaft 71. Mounted in this turret 146 are a number of reciprocating plungers 147. These plungers are equal in number to the notches 76 in the member 74, and are adapted to register therewith in radial position. Each of the plungers 147 has removably secured to its lower end by means of a tapered pin 148 a holder 149 which is adapted to embrace the can. The lower part of this holder is beveled at 150 so as to enable the holder to readily slip over the can. By removing the pins 148 the holder 149 may be changed to accommodate different styles or sizes of cans, or to perform different operations thereon. In Fig. 7 I have shown holders provided with slots 158 to receive a partition plate, while in Figs. 8, 9 and 10 I have shown the holders as provided with a recess 159 through which a forming roll may project to operate on the can, as will be hereinafter described. The upper end of each of the plungers 147 is provided with a laterally projecting roll 151 which travels between a pair of cam tracks 152 and 153, respectively, carried by plates 154 and 155 which are connected by means of bolts 156 and secured to the upper frame 60, as shown in Fig. 4. The plungers 147 are slightly tapered as shown in Fig. 7, which, together with their suspension from the roll 151 allows the holder 149 to have a pendular movement which facilitates the seating of the holder over the cans. The tracks 152 and 153 are secured to the plates 154 and 155 by means of bolts 157, as best shown in Fig. 7, so that the said tracks may be easily removed to change the class of work done upon the machine. It will be understood that as the turret or head 146 rotates the plungers 147 will be moved up and down to cause the holders 149 to engage with and be disengaged from the cans moved upon the table 70 by the member 72.

In case of very tall cans it is desirable to have a second moving member 160 similar to the member 72, which is provided with a removable projecting portion 74 like the projecting portion 74 hereinbefore described. Ordinarily, however, this member may be dispensed with, as shown in Fig. 4. In order to reduce friction, the weight of the turret 146 is supported by a ball-bearing 161 carried by the plate 155, as shown in Fig. 7. As the cans are moved by the members 74 past the last ram 84 hereinbefore described, the cans are engaged by a guard 162 secured by a bolt 163 passing through a slot 164 so that the guard may be moved toward and away from the member 74. Bolt 163 passes into a bracket 165 which is in turn adjustably connected by a bolt 166 to a bracket 167 secured to the frame 53 as best shown in Fig. 14. It will be evident that by this construction the guard 162 is rotatably adjustable both vertically and horizontally and at the same time a clear open space will be left around the table 70 so that any obstruction which may fall upon the table will not catch upon the guard or its support but will be readily discharged at the side of the table. At about the time that the can is engaged by the guard 162 one of the holders 149, hereinbefore described, will be lowered so as to engage with the can. Further movement of the can will bring it over a chuck 168 adapted to move vertically through an opening in the table 70. The chuck 168, as shown in Fig. 26, has a portion 168$^a$ which fits the can body. This portion is fluted at 168$^b$ to cause it to adhere firmly to the can and is provided with a curved portion 168$^c$ for forming an outwardly extending flange on the can body. The curved portion 168$^c$ terminates in a shroud 168$^d$ which forms a position stop for the edge of the can body, thus regulating not only the flange formed but also the height of the completed can body. The chuck 168 is carried upon a short shaft 170 which is journaled in a bracket 171. The shaft 170 has splined to it a bevel gear wheel 172 which engages with a second bevel gear wheel 173 on one end of the short shaft 174 also journaled in the bracket 171. At the opposite end of the shaft 174 is a bevel gear wheel 175 meshing with the bevel gear wheel 176 upon the shaft 177.

In order to move the shaft 170 it is provided at its lower end with a collar 178 in which runs a band 179 provided with trunnions 180 which are engaged by the forked end of a lever 181. This lever is formed in two parts pivoted together at 182 and is pivoted at 183 to the frame 53. The two parts of the lever 181 are moved relatively to each other by means of a bolt 184 and locking nuts 185. It will be evident that by moving these locking nuts 185 the two parts of the lever may be moved relatively to each other and consequently the height of the chuck above the table can be regulated. In order to actuate the lever 181 it is provided with an anti-friction roller 186, best shown in Fig. 14. This anti-friction roller 186 bears upon a cam 187 mounted upon shaft 69. In order to throw the lever 181 out of operation when it is not desired to spin the cans or other receptacles at this point in the operation of the machine, the said cam is keyed to a shaft 69 so as to rotate therewith but be movable longitudinally thereof and the said cam is engaged by a fork 188 mounted upon a rod 189 slidingly mounted in a bracket 190 carried on the frame 53, as best shown in Fig. 34. The rod 189 is fastened by means of a clamping screw 191 so as to hold the cam 187 either in its operative position in engagement with the wheel 186 or at one side thereof so as to throw the lever 181 out of operation.

Arranged directly above the chuck 168 is a similar chuck 192 carried on a shaft 193. This shaft has keyed to its upper end a bevel gear wheel 194 meshing with the bevel gear wheel 195 on the shaft 196 carried by the upper frame 60. This shaft 196 is provided on its end with a bevel gear wheel 197 meshing with the bevel gear wheel 198 on the shaft 177 hereinbefore referred to. It will thus be evident that the chucks 168 and 192 will be simultaneously rotated in the same direction. In order to move the spindle 193 vertically the said spindle is engaged by means of a lever 199 pivoted at 200 to a block 201 adjustable in a bracket 202 by means of a screw 203, as shown in detail in Fig. 17. In order to lock the screw 203 in any desired position it is provided with a hand wheel 204 the lower face of which is provided with notches adapted to engage with a spring detent 205. The pivot point of the lever 199 can thus be raised and lowered so as to secure the proper position of the chuck 192 and at the same time the detent 205 will lock the wheel 204 and thus firmly hold said lever in its adjusted position against accidental displacement. The can body, after being caught between the chucks 168 and 192 is adapted to be operated upon by forming rolls so as to form either internal or external flanges on the said body. These rolls are carried by a forming head 207 which is pivoted at 208 to a bracket 209 carried on the frame 60, as best shown in Fig. 23. Each of the forming rolls 210 is carried in a stem 211 slidingly mounted in a block 212. The end of the stem 211 is threaded and engaged with a threaded nut 213 by means of which the stem may be moved longitudinally to advance the seaming roll 210 toward its coöperating chuck or to remove it farther therefrom. The block 212 is also slidingly mounted in the forming head 207 so as to adjust the roll 210 vertically. This adjustment is obtained by means of a threaded rod 214 passing through the said block 212 and a lug 215 carried by the seaming head 207. Each of the rods 214 is provided with a head 216 by means of which it is rotated. In order to move the seaming head to bring the rolls 210 into and out of coöperation with their corresponding chucks, the said head is pivoted at 218 to an annular member 219 which is in turn adjustably connected by means of a bolt 220 to a bar 221. The opposite end of this bar 221 is connected at 222 to a lever 223 actuated by a cam 224 upon the vertical shaft 125 hereinbefore described. The lever 223 is held against the cam 224 by a spring 223ª. The lever 223 is pivoted to a stud 270 carried by a bracket 271 secured to the frame 60. Before the seaming rolls can operate upon a can it is necessary to supply the same with a cap or end piece, mechanism for accomplishing which will now be described.

Secured to the upper frame 60 is a bracket 225 carrying the bottom plate 226 of the cover chute, as shown in Fig. 30. This bottom plate 226 is provided on its upper face with a pair of tracks 227, as best shown in Fig. 33. At intervals the plate 226 is provided with laterally extending brackets 228 each of which is provided with a slot 229 through which passes a threaded rod 230. This rod is engaged above the bracket 228 by a nut 231 and below the said bracket by a thumb-nut 232. By this construction the rod 230 can be moved laterally toward and away from the bottom plate 226 and at the same time it can be moved vertically to adjust the height of an L-shaped side member 233 carried thereby. Each of these L-shaped side members 233 is provided with a bracket 234. The covers passing in the chute therefore run between the tracks 227 and 234, and the chute may be adjusted both laterally for varying diameters of caps, and vertically for varying thicknesses of caps. The chute is adapted to discharge the caps into the holders 149 so as to rest upon the flange formed thereon as is clearly shown in Fig. 30.

In order to properly guide the caps into the holders 249 I arrange directly over the path of the holder a guard 235 shown in detail in Fig. 31. This guard 235 is U-shaped as there shown, and is pivoted at 236 to a rod 237 carried by the upper frame 60. The guide 235 is preferably also provided with a finger 238 for forcing the can bodies down into the holder in case the can body should become raised after leaving the forming tools. In order to insure the passage of the caps down the cap chute, I provide the lower face of the bracket 225 with a second bracket 239 which is vertically adjustable, by means of a screw 240 and horizontally adjustable by means of a screw 241. This bracket 239 carries a shaft 242 on which is mounted a pair of flexible beaters or whips 243 which are adapted to strike the covers and thus insure their passage into the holders 149. The shaft 242 is driven by a sprocket chain 244. If desired, there may be additional shafts 242 and beaters 243 arranged along the chute, as is shown at the outer end of the bracket 225. All these shafts with their beaters may be driven by the same sprocket chain 244, see Fig. 2. The sprocket wheels may be driven from any suitable source of power, which may be other than that driving the main machine.

In order to control the feed of the caps along the chute I pivot to the bottom plate 226 at 245 a rocking member 246 carrying a finger 247 which projects up into the chute through an opening 248 and thus stops the caps from flowing in the chute. This rocking member 246 is provided with an arm 249 on which is adjustably mounted a curved finger 250 adapted to project up into the chute through an opening 251 as the finger 247 is withdrawn. In this manner the caps are fed one at a time into the holders 149. By moving the finger 250 along the arm 249 the feed may be adjusted for caps of varying diameter. The side members 233 are cut away above the rocking member 146 to allow for the passage of the fingers. In order that the caps may not be accidentally forced through this cut away portion, I provide above the rocking member 146 a guard 252 best shown in Fig. 33. This guard 252 as shown in said figure is carried by a bracket 253 which extends around one of the side members 233 and is adjustably secured by bolts 254 to a downward extension 255 of the bottom plate 226. The guard 252 may be adjusted to accommodate varying heights of caps by loosening the screws 254. In order to actuate the rocking member 246 the said member is pivoted at 256 to a rod 257 passing through a lug 258 carried by a bar 259. This rod 257 is provided at the inner side of the lug 258 with a pair of jam nuts 260 and has surrounding it at the opposite side of said lug a convex faced washer 261 bearing against which is one end of a coil spring 262 the opposite end of which bears against a nut 263 at the outer end of the rod 257. The rocking member 246 is thus actuated each time the bar 259 is actuated. Should, however, one of the caps become caught beneath the finger 251, the spring 262 would yield so as to prevent breakage of the cap or the machine. This spring 262 also provides means whereby the caps may be fed by hand by movement of the bar 259.

In order to insure the seating of the caps on the can bodies in the holders 149, I provide a pusher arm 264 which is made in two parts adjustably connected by a thumb-nut 265 so that the limit of the movement of the said pusher arm may be varied. This arm may also be vertically adjusted by means of a bolt 267 which secures it to the bar 259. The bar 259 is pivoted at one end to a bracket 209 hereinbefore described and at the other end bears upon a cam 269 carried upon the vertical shaft 125. The bar 259 is held against the cam 269 by a spring 259ª. The can, after being supplied with its cap, is carried by the member 74 until it is brought over a chuck 272 shown in detail in Fig. 21. This chuck 272 projects through the table 70 and is adapted to run loosely upon a short rod 273, ball bearings 274 being placed between the end of said rod and the chuck. The rod 273 is carried in a sleeve 275 and rests upon a coil spring 276 carried within the said sleeve. The sleeve is vertically adjustable and is clamped in position by means of screw 277 in a boss 278 on the frame 53. The upward movement of the rod 273 is also limited by means of a screw 279 passing through a slot 280 in the sleeve 275. The lower end of the sleeve 275 bears upon one arm of a bell crank lever 281, the opposite arm of which is provided with an adjustable member 282 carrying an anti-friction roll 283 bearing upon a cam 284 mounted upon the vertical shaft 125. The member 282 is pivoted to the bell-crank lever at 286 and is adjusted by means of a screw 287 passing through a slot 288 as shown in Fig. 22. The movement of the bell crank lever is limited in one direction by means of a screw 289 and in the other by a screw 290 carried in a lug 291 on the bracket 292 supporting the bell crank lever. By means of this construction additional pressure is placed upon the can body while the seam is being formed so as to insure a true double seam, as will be fully hereinafter set forth in connection with the complete operation of the machine.

Arranged above and in line with the chuck 272 is a chuck 295 carried upon a spindle 296 journaled in the bracket 271 hereinbefore described. The chuck 295 is provided with a flange 295ª of just sufficient thickness to fill the depression in the cap or end piece. This chuck, as shown in Figs. 37 and 38, is also preferably provided on its lower face with teeth 295ᵇ to prevent slippage between the chuck and cap. The chuck 295 as well as the other chucks carried on spindles, are preferably secured in position as will now be described.

The spindle is offset at 296ª so as to fit a central opening in the chuck. The reduced end of the spindle is split and is provided with a tapered opening in which fits a taper plug 296ᵇ having a threaded inner end 296ᶜ which engages with a corresponding thread in the spindle. The outer end of the plug is provided with a square tool opening 296ᵈ. The upper end of the spindle 296 is provided with a bevel gear wheel 297 meshed with a bevel gear wheel 298 on the shaft 196 hereinbefore described. In order to move the spindle 296 vertically, a lever 299 is provided which is operated from a cam on the horizontal cam shaft in the same manner as the lever 199 hereinbefore described. In order that the spindle 296 may have vertical play while its chuck is seating on the can cap, the attachment of the operating lever to the spindle is made as shown in Fig. 39. The lever 299 is pivoted to a collar 285 loosely surrounding the shaft. This collar 285 is situated between collars 293 and 294, rigidly secured to the spindle. The distance between the collars 293 and 294 is somewhat greater than the thickness of the collar 285. It will be evident that as the spindle descends the collar 293 will rest on the collar 285 until the chuck comes into contact with the top of the can and that the spindle will be free to move longitudinally until the collar 285 comes into contact with the collar 294 to exert pressure on the cap. Adjacent to the spindle 296 is a spindle 300 which is rotated from the spindle 296 by means of an intermediate gear 301 as best shown in Fig. 27. The bracket 271 also carries a stud 302 which is arranged adjacent to the spindle 300. Pivoted on the studs 270 and 302 are a pair of arms 303 and 304 which carry stems and blocks 211 and 212 respectively, like those above described in connection with the flanging operation. The bar 308 is held against its cam by means of a spring 308ª. The stems 211 however carry a seaming roll 305 and a finishing roll 306 in place of the flanging rolls 210 hereinbefore referred to. The seaming roll 305 is provided with a recess 305ª which coöperates with the flange 295ª on the chuck 295. The roll 305 is also provided with an overhanging flange 305ᵇ which is beveled on its lower face as shown at 305ᶜ. This beveled overhanging flange insures the proper engagement of the seaming roll with the edge of the can cap. The arms 303 and 304 are connected by a strap 307 by which is carried an arm 308 which bears upon a cam 309 on the vertical shaft 125. The seaming roll 305 and finishing roll 306 are therefore simultaneously actuated by the cam 309. The spindle 300 carries a chuck 310 which is similar to the chuck 295 hereinbefore described except that the flange 310ᶜ is of greater depth than the depression in its can cap so as to prevent the metal of the cap from being forced over the top of the flange, thus causing the cap to adhere to the chuck. The finishing roll 306 is provided with a recess 306ª to receive the seam and an upwardly extending straight portion 306ᵇ, as best shown in Fig. 29. The lower end of the can engaged by the chuck 310 on the spindle 300 rests upon a chuck 311 shown in Fig.

14. This chuck 311, like the chuck 272, is supported on ball bearings, but is not actuated vertically.

In order to move the spindle 300 vertically to engage or release the can, the said spindle is engaged by a lever 315, best shown in Fig. 15, which is operated in the same manner as the levers 199 and 299 hereinbefore described. After the seam of the can has been flattened by the roll 306 the can is carried around to position under spindle 316. At this point the holder 149 will be raised to allow the can to be discharged onto the rotary table 65. As, however, the seam formed on the can will sometimes tightly fit the holder, the lower end of the spindle 316 is provided with a weight 317, best shown in Fig. 1, which weight will strike the cap of the can and insure the disengagement of the can from the holder. The spindle 316 is engaged by a lever 318, which, together with the levers 199, 229 and 315, is actuated from a shaft to be hereinafter described.

After the can has been discharged onto the table 65 it is carried by the movement of said table to a conveyer 319, best shown in Fig. 5, by means of which conveyer the can is carried away from the machine. The conveyers 64 and 319 are separated by an adjustable dividing piece 355 which is loosely mounted on the shaft 66. The dividing piece is provided with a lug 356 through which passes a bolt 357 engaging with a slot 358 in a segment 359 carried by the frame 53.

In order to control the operation of the machine the shaft 196, best shown in Fig. 15, is provided with tight and loose pulleys 320 and 321 respectively, which are engaged by a belt 322 shown in Fig. 1. This belt is shifted from one to the other of the pulleys by means of a sliding rod 324, which rod is mounted in a bracket 325 carried upon the upper frame 60. By moving the rod 324 the parts of the gearing controlling the rotation of the various spindles will be thrown into and out of operation. The rod 324 has connected to it a lever 327, as best shown in Fig. 1. This lever 327 is pivoted at 328 and is connected by means of links 329 with a clutch mechanism 330 shown in detail in Fig. 2. This clutch mechanism 330 is situated inside of a pulley 331 driven by a driving belt 332. The clutch is thus adapted to bring the driving belt into operative connection with a shaft 333 upon which are mounted the cams for controlling the vertical movement of the various spindles. This shaft 333 is also connected by means of bevel gears 334 and 335 with the vertical shaft 125 upon which are mounted the various cams for controlling the movement of the lower spindles, and the rotation of the member 72, as well as the movement of the various flanging and seaming rolls. The clutch 330 is so arranged that it does not reach its operative position until the end of the movement of the rod 324. In this way the mechanism for rotating the spindles is thrown into operation before the mechanism for advancing the cans and moving the spindles longitudinally is operated. The shaft 333 is provided with four cams 337 each of which coöperates with an anti-friction roll 338 carried by one of the levers 199, 299, 315 or 318 to actuate said levers. The end of each of said levers is pivoted to a link 339 which is in turn pivoted to a plunger 340 in a barrel 341. The barrels 341 are carried by a bracket 342 secured to the frame 60. Within each of the barrels 341 is a spring 342, best shown in Fig. 36. In order to adjust the tension of the spring 342 I provide a plunger 343 bearing on the top of the spring and provided with a stem 344 threaded in the head of the barrel. After the tension of the spring is adjusted the stem 344 is locked in position by a lock nut 345.

In Fig. 16 I have shown a modification in which the top of the barrel is left open and the spring and its adjusting means are replaced by a weight 346. In the modification, adjustment may be made by replacing the weight, which is easily removable, by another of greater or less mass. It will be understood that the object of the weight or spring is to counterbalance the spindles carried by the levers.

The shaft 333 is provided at each end with a hand wheel 336 by means of which the cans may be advanced manually. This operation is of great advantage in securing the various adjustments of the machine, especially when changing from one style or size of can to another, as it will be evident that the mechanism for spinning the cans may be thrown into operation and worked at full speed from the belt drive while the cans may be slowly advanced by hand and each operation carefully inspected until the proper adjustments have been secured, after which by a further movement of the rod 324 the clutch 330 is thrown into operation and the entire mechanism is operated from the drive.

In Fig. 20 I have shown a modification in which one end of the can body has formed on it an inwardly extending flange to adapt it for use with a slip cover. In this construction the chuck 168 is replaced with a chuck composed of two parts, a body 350 adapted to enter the can body, and a disk 351 which forms a stop for the edge of the can body, thus performing the same function as the shroud 168ᵈ on the chuck 168. The body 350 is provided with a curved surface 352 to form the flange and is also preferably provided with an offset 353 so as to contract the mouth of the can to such an extent that the slip cover will be flush with the sides of the can. It will be evident that the chuck body 350 must be smaller than the can so that it may be removed after the flange is formed. In order that the can may not be thrown out of its perpendicular position when acted upon by the flanging rolls the spindle 170 is placed slightly eccentric with relation to the spindle 193 so that the sides of the chucks 192 and 350 may be in alinement at the point where they are engaged by the flanging rolls. It will be understood that in the modification the lower flanging roll 210 is replaced by a roll 354 having a face complementary to the face of the body 350.

The operation of my machine, briefly stated, is as follows: The cans are delivered by means of the conveyer 64 onto the rotary table 65. From this table the cans are forced onto the non-rotary table 70 and are caused to enter the recesses 76 by means of the rams 84. In case of a can body being of great diameter or being flattened so that it will not properly enter the recesses 76, it is discharged between the last ram 84 and the guard 162. It will be evident that in case the can is flattened, or is of greater than normal diameter, it will be engaged by the guard 162, the rams 84 being yielding, the advancing cans will force these rams back and destroy or discharge the over-sized can from the table 70. After the can has been properly seated in the recesses 76 and carried into engagement with the guard 162, one of the holders 149 is lowered into position to encircle the top part of the can. The can is now fed forward until it rests upon the chuck 168, at station A, which chuck is raised at the same time that its coöperating chuck 192 is lowered. After the can body has been engaged by these two chucks the flanging rolls 210 are moved into engagement with the can so as to spin a flange upon each end of the can, as best shown in Fig. 24. After the flanges have been formed upon the ends of the can the chucks recede to their initial position and the can is fed forward until it is under the guard 235, at station B, as best shown in Fig. 30. While in this position, the cap is fed onto the upper end of the can body by the cap feeding mechanism, shown in this figure. The can is then fed forward until it rests upon the chuck 272 at station C, said chuck being shown in detail in Fig. 21. While in this position the spindle 296 is lowered so that the chuck 295 carried thereby engages the top of the can. As has been hereinbefore described, the spindle 296 is so carried that it has free longitudinal play at the moment when the chuck 295 engages the cap of the can. This free play or sensitive movement, as it may be termed, insures the proper seating of the chuck on the cap and the cap on the can. The seaming roll 305 is moved into engagement with the cap upon the upper end of the can so as to turn over the edge of the said cap and form a seam. At the same time, the cam 284 acting upon the bell crank lever 281, forces the chuck 272 upwardly, and in this way causes the material of the can body to be forced around into the curled edge of the cap, thus insuring the formation of a true double seam. After this seam has been formed, the can moves forward another step and comes into position over the chuck 311, at station D. While resting upon this chuck 311 the top of the can is engaged by the chuck 310, as best shown in Fig. 29, and the finishing roll 306 is brought into engagement with the bevel seam to flatten and tighten the same. After this operation, the seam of the can is complete, and it is only necessary for the plunger 317 at the ejecting station E to force the finished can out of the holder onto the rotary table 65 from which it is delivered to the carrier 319 which delivers the finished cans from the machine.

I claim:

1. The combination with a rotary member adapted to carry cylindrical receptacles, of means for imparting intermittent motion to said member, a plurality of holders movable with said member and adapted to embrace the receptacles, means for independently moving said holders toward and away from said rotary member to engage and disengage the receptacles carried thereby, means for rotating said receptacles, and a forming tool operating on said receptacles.

2. The combination with a non-rotary table on which receptacles are adapted to move, of a rotary member carrying receptacles on said table, holders adapted to embrace said receptacles, means for moving said holders toward and away from said table to engage and disengage with said receptacles, and a member carrying a tool for operating on said receptacles.

3. The combination with a table on which receptacles are adapted to move, of a movable member adapted to carry cylindrical receptacles on said table, holders adapted to embrace said receptacles, means for moving said holders toward and away from said table to engage and disengage with said receptacles, means for rotating said receptacles on their axes, and a forming tool movable laterally toward and away from said receptacles and adapted to operate thereon.

4. The combination with a non-rotary table on which receptacles are adapted to move, of a rotary member adapted to carry cylindrical receptacles on said table, holders adapted to embrace said receptacles, means for moving said holders toward and away from said table to engage and disengage with said receptacles, means for rotating said receptacles on their axes, and a forming tool moving laterally toward and away from said receptacles and adapted to operate thereon.

5. The combination with a table on which receptacles are adapted to move, of a movable member carrying receptacles on said table, means for adjusting said movable member toward and away from said table, holders adapted to embrace said receptacles, means for moving said holders toward and away from said table to engage and disengage with said receptacles, and a member carrying a tool for operating on said receptacles.

6. The combination with a non-rotary table on which receptacles are adapted to move, of a rotary member carrying the receptacles on said table, means for adjusting said rotary member toward and away from said table, holders adapted to embrace said receptacles, means for moving said holders toward and away from said table to engage and disengage with said receptacles, and a member carrying a tool for operating on said receptacles.

7. The combination with a table on which receptacles are adapted to be moved, of a movable member adapted to carry cylindrical receptacles on said table, means for adjusting said movable member toward and away from said table, holders adapted to embrace said receptacles, means for moving said holders toward and away from said table to engage and disengage with said receptacles, means for rotating said receptacles on their axes, and a forming tool movable laterally toward and away from said receptacles and adapted to operate thereon.

8. The combination with a non-rotary table on which receptacles are adapted to be moved, of a rotary member adapted to carry cylindrical receptacles on said table, means for adjusting said rotary member toward and away from said table, holders adapted to embrace said receptacles, means for moving said holders toward and away from said table to engage and disengage with said receptacles, means for rotating said receptacles on their axes, and a forming tool movable laterally toward and away from said receptacles and adapted to operate thereon.

9. The combination with a non-rotary table, of a rotary member adapted to move receptacles on said table, a second rotary member moving with said first rotary member, a plurality of holders carried by said second rotary member and adapted to embrace said receptacles, means for reciprocating said holders to move the same into and out of engagement with said receptacles, and a member carrying a tool for operating on said receptacles.

10. The combination with a non-rotary table, of a rotary member adapted to move receptacles on said table, a second rotary member moving with said first rotary member, a plurality of holders carried by said second rotary member and adapted to embrace said receptacles, a cam track for reciprocating said holders to move them into and out of engagement with said receptacles, and a member carrying a tool for operating on said receptacles.

11. The combination with a non-rotary table, of a rotary member adapted to move cylindrical receptacles on said table, a second rotary member movable with said first rotary member, holders carried by said second rotary member and adapted to embrace said receptacles, means for reciprocating said holders to move them into and out of engagement with said receptacles, means for rotating said receptacles on their axes, and a forming tool for operating on said receptacles.

12. The combination with a non-rotary table, of a rotary member adapted to move receptacles on said table, a second rotary member movable with said first rotary member, a plurality of holders carried by said second rotary member and adapted to embrace said receptacles, said holders having lateral openings, means for reciprocating said holders to move them into and out of engagement with said receptacles, and a forming tool, said forming tool being adapted to engage said receptacles through the lateral openings of said holders.

13. The combination with a movable member adapted to carry receptacles, of a plurality of reciprocating holders adapted to be moved into and out of engagement with said receptacles, said holders having lateral play to facilitate their engagement with said receptacles, and a member carrying a tool for operating on said receptacles.

14. The combination with a rotary member adapted to carry receptacles, of a cam track, a plurality of holders pendulously carried by said cam track, said holders being movable into and out of engagement with said receptacles, and a secondary rotary member moving with said first member and imparting movement to said holders.

15. The combination with a non-rotary table, of a rotary member adapted to move cylindrical receptacles on said table, means for rotating said receptacles on their axes, a cam track, a plurality of holders pendulously carried by said cam track and adapted to be moved thereby into and out of engagement with said receptacles, a second rotary member movable with said first rotary member and imparting movement to said holders, and a forming tool adapted to be moved into and out of engagement with said receptacles.

16. The combination with a movable member having recesses to receive receptacles, of means for feeding receptacles to said member, and a plurality of yielding rams for seating said receptacles in said recesses.

17. The combination with a movable member having recesses to receive receptacles, of means for feeding receptacles to said member, a plurality of yielding rams for seating said receptacles in said recesses, and anti-friction rollers carried on the ends of said rams.

18. The combination with a movable member having recesses to receive receptacles, of means for feeding receptacles to said member, a plurality of yielding rams for seating said receptacles in said recesses, and adjustable means for limiting the movement of said rams toward said movable member.

19. The combination with a movable member having recesses to receive receptacles, of means for feeding receptacles to said member, and a plurality of yielding rams for seating said receptacles in said recesses, each of said rams having a projection adapted to engage and move the next succeeding ram.

20. The combination with a movable member having recesses to receive receptacles, of a yielding guide plate for delivering the receptacles to said member, a plurality of yielding rams adjacent to said guide plate for seating the receptacles in the said recesses and a connection between one of said rams and said guide.

21. The combination with a movable member having recesses to receive receptacles, of a pivoted guide plate for delivering receptacles to said member, and a plurality of yielding rams for seating said receptacles in said recesses, one of said rams having pivotal connection with said guide plate.

22. The combination with a movable member having recesses to receive receptacles, of a pivotal member, a guide plate having sliding connection with said pivotal member and a plurality of yielding rams for seating said receptacles in said recesses, one of said rams having pivotal connection with said guide plate.

23. The combination with a movable member having recesses to receive receptacles, of an adjustably pivotal member, a guide plate having sliding connection with said pivotal member, and a plurality of yielding rams for seating said receptacles in said recesses, one of said rams having pivotal connection with said guide plate.

24. The combination with a movable member having recesses to receive receptacles, of a pivotal member, a plurality of yielding rams for seating the receptacles in said recesses, and a guide plate having sliding connection with said pivotal member, said guide plate being formed of two parts, one pivotally connected with one of said rams and the other adjustably carried by said first named part.

25. The combination with a movable member having recesses to receive receptacles, of means for feeding receptacles to said member, a frame, a plurality of yielding rams carried by said frame for seating the receptacles in said recesses, and means for adjusting said frame member toward and away from said movable member.

26. The combination with a movable member having recesses to receive receptacles, of means for feeding receptacles to said member, a frame, a plurality of yielding rams carried by said frame for seating the receptacles in said recesses, and means for adjusting said frame vertically.

27. The combination with a movable member having recesses to receive receptacles, of means for feeding receptacles to said member, a frame, a plurality of rams yieldingly carried in said frame, and weights normally moving said rams toward said member to seat the receptacles in said recesses.

28. The combination with a movable member having recesses to receive receptacles, of means for feeding receptacles to said member, a frame, a plurality of rams slidingly carried in said frame, and a plurality of separable weights normally moving said rams toward said member to seat the receptacles in said recesses.

29. The combination with a movable member having recesses to receive receptacles, of means for feeding receptacles to said member, a frame, a plurality of rams slidingly mounted in said frame and provided with anti-friction rollers on their ends, each of said rams being provided with a projection adapted to engage with the next succeeding ram, weights normally moving said ram toward said rotary member to seat the receptacles in said recesses, means for adjusting said frame toward and away from said movable member, and means for adjusting said frame vertically.

30. The combination with a rotary table, of a rotary member adjacent thereto and provided with recesses to receive receptacles delivered thereto by said rotary table, and a plurality of yielding rams for seating the receptacles in said recesses.

31. The combination with a rotary table, of a non-rotary table adjacent thereto and adapted to receive receptacles therefrom, a rotary member arranged above said non-rotary table and provided with recesses to receive receptacles, a pivoted plate for guiding the receptacles from said rotary table to said non-rotary table, a plurality of independently yielding rams for seating the receptacles in said recesses, and a yielding ram connected to said guide plate.

32. The combination with receptacle advancing mechanism, of rotating mechanism for the receptacles, and a single movable member for controlling both said mechanisms, said member being adapted to throw said rotating mechanism into operation in advance of said receptacle advancing mechanism.

33. The combination with receptacle advancing mechanism, of rotating mechanism for the receptacles, a single movable member for controlling both said mechanisms, said member being adapted to throw said rotating mechanism into operation in advance of said receptacle advancing mechanism, and manually operated means for actuating said receptacle advancing mechanism.

34. The combination with receptacle advancing means, of a longitudinally movable plunger for operating on said receptacles, a lever for reciprocating said plunger, and means for adjusting the pivot point of said lever.

35. The combination with receptacle advancing means, of a longitudinally movable plunger operating upon the receptacles, a lever for reciprocating said plunger, means for adjusting the pivot point of said lever, and an automatic locking device for said adjusting means.

36. The combination with receptacle advancing mechanism, of an inclined chute delivering caps to said receptacles, a rocking member provided with fingers for feeding the caps in said chute, and means for adjusting the distance between said fingers.

37. The combination with receptacle advancing mechanism, of an inclined chute for delivering caps to the receptacles, a rocking member, a forward finger carried by said member for engaging the cap, and an adjustable curved rear finger carried by said member for advancing the caps.

38. The combination with receptacle advancing means, of gearing for operating said means, an inclined chute for delivering caps to the receptacles carried by said means, a locking member provided with a pair of fingers for controlling the caps in said chute, a vibrating member actuated from said gearing, a rod pivoted to said rocking member and projecting through said vibrating member, an adjustable stop carried by said rod at one side of said vibrating member and forming a rigid abutment, and a spring surrounding said rod at the other side and forming a yielding abutment.

39. The combination with receptacle advancing means, of a chute delivering caps to the receptacles advanced by said means, a rotary member arranged adjacent to said chute, arms carried by said rotary member and adapted to engage and feed the caps in said chute, and means for adjusting said rotary member toward and away from said chute.

40. The combination with receptacle advancing means, of a chute delivering caps to the receptacles advanced by said means, a rotary member arranged adjacent to said chute, flexible arms carried by said rotary member and adapted to engage and feed the caps in said chute, and means for adjusting said rotary member horizontally and vertically.

41. The combination with receptacle advancing means, of an inclined chute for delivering the caps to the receptacles carried by said means, a rocking member for feeding the caps in said chute, said chute having an opening in its top above said rocking member, and a guard for the caps arranged in said opening above said rocking member.

42. The combination with receptacle advancing means, of an inclined chute for delivering caps to the receptacles carried by said means, a rocking member for feeding the caps in said chute, a guard for the caps arranged above said rocking member, and means for adjusting said guard toward and away from said rocking member.

43. The combination with a movable member, of holders carried thereby and adapted to engage receptacles, means for feeding caps to said holders, and a guide for the caps arranged above the path of the holders, said guide being directly above the holders at a point where the cap is fed to the holder, whereby said guide receives the cap between itself and said holder and directs the cap into the receptacle carried by the holder.

44. The combination with a movable member, of holders carried thereby and adapted to engage the receptacles, means for feeding the caps to said holders, and a pivoted guide for the caps arranged above the path of the holders, said guide being arranged directly above the holder when the holder is in position to receive the cap, whereby said cap is received between the guide and the holder and directed into the receptacle carried by the holder.

45. The combination with a movable member, of a holder carried by said member and adapted to engage the receptacles, means for feeding caps to said receptacles, and a reciprocating pusher arm operating at right angles to the axes of the receptacles for seating the caps on the receptacles in said holders.

46. The combination with a movable member, of holders carried by said member and adapted to engage the receptacles, means for feeding caps to said receptacles, a reciprocating pusher arm operating at right angles to the axes of the receptacles for seating the caps on the receptacles in said holders, and means for adjusting the length of said arm.

47. In a cap chute the combination with a bottom member, of a pair of side members, means for adjusting each of said side members laterally, and means for adjusting each of said side members vertically.

48. In a cap chute the combination with a bottom member, of a pair of overhanging side members, means for adjusting each of said side members laterally, and means for adjusting each of said side members vertically.

49. In a cap chute the combination with a bottom member provided with tracks, of a pair of overhanging side members each provided with a track, means for adjusting each of said side members laterally, and means for adjusting each of said side members vertically.

50. The combination of a receptacle support, means for feeding heads or caps and embodying an escapement, and a carrier movable between the support and feeding means for transferring a head or cap from the feeding means to a receptacle on said support, means operative through said carrier for rotating the receptacle and the head thereon, and a beader operative automatically on the head or cap during rotation of the same and the receptacle.

In testimony whereof, I have hereunto set my hand and affixed my seal in the presence of the two subscribing witnesses.

CHESLEY T. SMALL. [L.S.]

Witnesses:
L. A. WILSON,
B. L. CROWLEY.